United States Patent [19]
Ellison et al.

[11] 4,422,811
[45] Dec. 27, 1983

[54] HOLE SAW

[75] Inventors: Bruce Ellison, Leeds; James A. DeCarteret, Bernardston, both of Mass.

[73] Assignee: Ingersoll-Rand Company, Woodcliff Lake, N.J.

[21] Appl. No.: 225,849

[22] Filed: Jan. 16, 1981

[51] Int. Cl.³ .............................................. B23B 51/04
[52] U.S. Cl. ..................... 408/204; 125/20; 144/23; 408/703
[58] Field of Search ............... 408/204, 205, 206, 703; 144/20, 23; 125/20; 411/156, 544, 545

[56] References Cited
U.S. PATENT DOCUMENTS

| | | | |
|---|---|---|---|
| 551,043 | 12/1895 | Otto | 411/156 |
| 1,645,736 | 10/1927 | Blanch et al. | 408/206 |
| 3,758,221 | 9/1973 | Meshulam | 408/204 |
| 3,837,759 | 9/1974 | Bittern | 408/204 |

Primary Examiner—Z. R. Bilinsky
Attorney, Agent, or Firm—Walter C. Vliet

[57] ABSTRACT

A new and improved hole saw construction providing a low cost hole saw mandrel with improved driving capability. A unique drive washer cooperates with radial stiffening ribs on a hole saw blade to effect the improved driving capability.

2 Claims, 4 Drawing Figures

HOLE SAW

SUMMARY OF THE INVENTION

The invention relates to a new and improved hole saw construction wherein a unique drive washer cooperates with radial stiffening ribs on the hole saw blade to effect a more positive drive. The simplified construction eliminates the need for drive pins or the like which are subject to shear failure and are expensive to manufacture.

The object of the invention is to provide a new, improved, low cost hole saw construction. A further object of the invention is to provide a more positive drive by means of a unique drive washer operating in combination with radial stiffening ribs on the hole saw blade. These and further object of the invention are obtained in a hole saw comprising: a mandrel; a hole saw blade disposed on the mandrel for rotation with the mandrel about the mandrel axis; a drive washer disposed on the mandrel for rotation with the mandrel about the mandrel axis; a mandrel nut disposed on the mandrel to secure the hole saw blade and the drive washer to the mandrel; and the hole saw blade and the drive washer are provided with cooperating drive means for driving the hole saw blade.

DESCRIPTION OF THE PREFERRED EMBODIMENT

Figure 1:
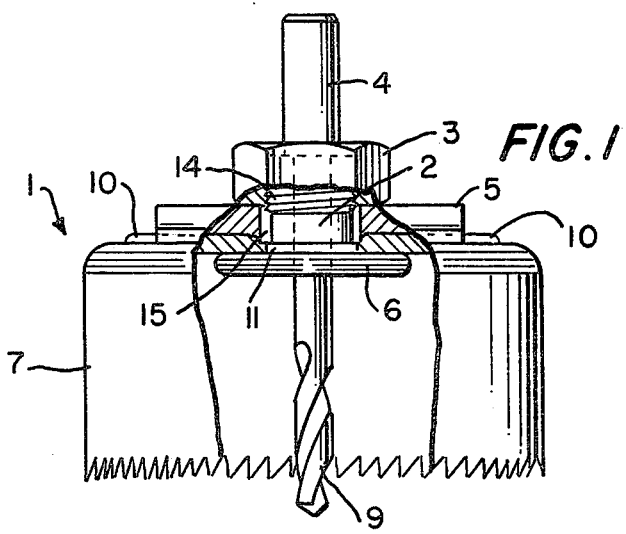
FIG. 1 is a partially sectioned side elevation showing the overall construction of the hole saw.
Figure 4:
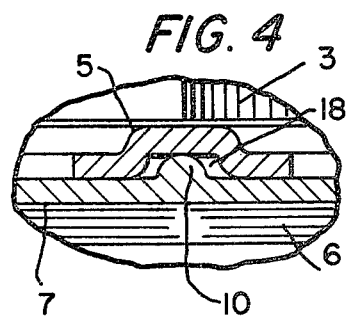
FIG. 4 is a cross sectional elevation view of a portion of the hole saw taken at section 4—4 of FIG. 3.

Referring to FIG. 1, a hole saw assembly is shown as generally indicated by reference numeral 1. The hole saw assembly is comprised of essentially five mating pieces; a mandrel 2, a mandrel nut 3, a drive washer 5, and a hole saw blade 7.

Figure 2:
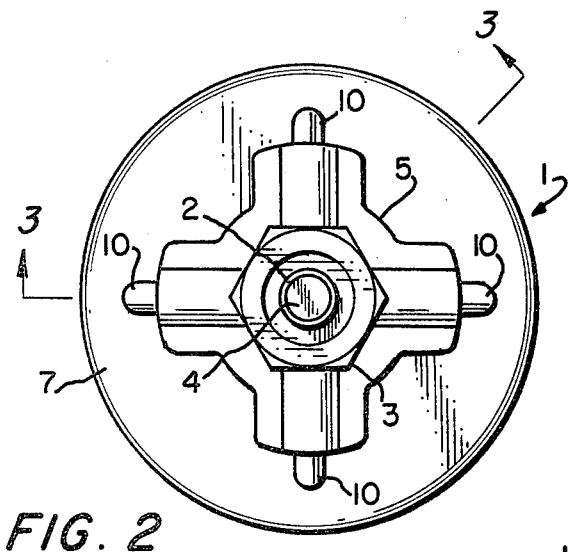
FIG. 2 is a top view of the hole saw assembly.
Figure 3:
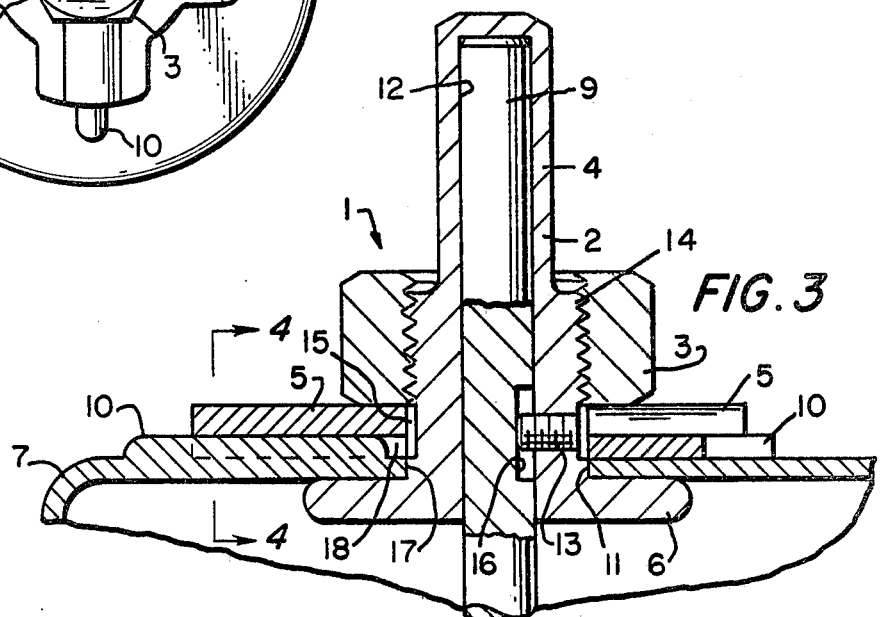
FIG. 3 is a cross sectional elevation view of the mandrel portion of the hole saw.

Referring to FIG. 2, a mandrel 2 is shown having a conventional drill shank 4 at its one end. The shank is used to attach the hole saw to the drill drive means, usually by means of a collect or gear type chuck. The center portion of the mandrel 2 is provided with a threaded section 14. The threaded section is of slightly larger diameter than shank and is provided with a conventional left hand thread. Towards the other end of the mandrel, a back boss or land 6 is provided. The back boss or land is of greater diameter than either the threaded portion or the shank.

Intermediate of the threaded section 14 and backing land 6 is a centering shoulder 11 corresponding approximately in diameter to the outside diameter of the thread. The centering shoulder 11 abuts the backing land 6. Between the backing land 6 and the thread is a recess 15 having a diameter corresponding closely to the root diameter of the thread.

An internal bore 12 is provided in the mandrel extending from the other end of the mandrel at the backing land 6 to substantially but not completely through the shank 4. Disposed in the internal bore 12 is a conventional center drill 9. The center drill is retained in the bore by means of a set screw 13 which extends from the recess 15 into the internal bore 12 and which cooperates with a flat 16 on the drill to retain it.

A cup-shaped hole saw blade 7 is shown disposed upon the mandrel in contact with the backing land 6 and centered about the mandrel by means of centering shoulder 11. The hole saw blade is a new construction in that it is provided with radially disposed stiffening and driving ribs 10. In the preferred embodiment, four of these ribs are provided spaced 90 degrees apart on the back of the hole saw blade. The centering shoulder cooperates with a centering hole 17 provided in the back of the hole saw blade.

A unique cross-shaped drive washer 5 is shown disposed about the mandrel in the area of the recess. The drive washer is provided with radial depressions 18, which are spaced 90 degrees apart (best seen on FIG's. 2 and 4), and which cooperate with the radial driving ribs. It should be appreciated by one skilled in the art that the driving means on the washer and the driven means on the saw blade must interferingly cooperate but either may be the projection or the depression.

The drive washer 5 is shown secured against the hole saw blade 7 by means of a mandrel nut 3. In conventional operation, the hole saw is driven clockwise by a powered drill or the like. The counterclockwise tightening of the mandrel nut assures the compression of the drive washer and thereby reliably secures hole saw blade 7 against the backing land 6 of the mandrel.

The radially extending driving means on the cross-shaped drive washer and ribs on the back of the hole saw blade distributes the torsional drive moment outward from the center of the drill. The stiffening ribs and the cross-shaped drive washer also contribute to the overall rigidity of the hole saw assembly. This is particularly important in the larger size hole saws.

The nature of the construction lends itself to stamping operations for the hole saw and drive washer thus allowing substantial economy in the manufacture of these parts. The mandrel is a simple machined part that may be turned out by automatic screw machine operations at substantial cost savings. The centering hole in the hole saw blade is circular thereby eliminating the need for square hole punches or pins as commonly required in previous hole saw blades of this type. The hole saw construction also avoids the need for a reinforced collar in the center hole area of the hole saw blade as was commonly required in previous construction. The centering hole also need not be threaded as was common in previous construction.

Having described our invention in terms of a preferred embodiment, we do not wish to be limited in the scope of our invention except as claimed.

We claim:

1. A hole saw comprising:
    a mandrel;
    a hole saw blade disposed on said mandrel for rotation with said mandrel about the mandrel axis;
    a drive washer disposed on said mandrel for rotation with said mandrel about the mandrel axis;
    a mandrel nut disposed on said mandrel to secure said hole saw blade and said drive washer to said mandrel;
    said hole saw blade and said drive washer are provided with cooperation drive means for driving said hole saw blade;
    said mandrel is provided with a backing land at its one end and a drive shank at its other end;
    said hole saw blade abuts said backing land;

said driver washer abuts said hole saw blade;
said mandrel nut abuts said drive washer;
said mandrel nut is secured to said mandrel by means of a left hand thread; and
said cooperating drive means are elongated radially extending ribs on one of said hole saw blade and said drive washer and coacting elongated radially extending depressions on the other of said hole saw blade and said drive washer said hole saw blade and said drive washer which serving to drive said hole saw blade and further serving as stiffening means for said hold saw blade.

2. The hole saw according to claim 1 wherein:
said drive washer is cross-shaped with radial depression.

* * * * *